United States Patent Office 3,664,851
Patented May 23, 1972

3,664,851
COMPOSITIONS OF MATTER
Willem Hendrik Feenstra and Johann Georg Keppler, Vlaardingen, Netherlands, assignors to Lever Brothers Company, New York, N.Y.
No Drawing. Filed Oct. 13, 1969, Ser. No. 865,990
Claims priority, application Luxembourg, Oct. 14, 1968, 57,084/68
Int. Cl. A23d 5/04
U.S. Cl. 99—163                                           5 Claims

ABSTRACT OF THE DISCLOSURE

Improved fatty acid products of enhanced flavour characteristics have incorporated autoxidation flavour counteractants of the formula RCH:CHCH:CHZ where R is an alkyl group containing up to 9 carbon atoms and Z is an organoleptically acceptable polar group. The fatty acid products include edible fats and oils particularly tallow and soybean oil, and their products such as margarine. The counteractants may be free or combined fatty acids or aldehydes, which are effective in minute amounts, and they may be incorporated at least in part by precursors added to convert to the counteractant in the fatty acid product during storage.

---

This invention relates to improved compositions of matter comprising fatty acid products susceptible to deterioration during storage by autoxidation with the formation of off-flavours.

The fatty acid products with which the invention is concerned include products comprising fatty acids themselves as well as their derivatives, for example esters, in particular glycerides, including fats and oils. Such products include for example shortenings, margarine, mayonnaise and salad dressings among edible products, as well as soaps.

Fatty acid products such as these are often susceptible to deterioration with the development of off-flavours during storage as a result of the autoxidation of the fatty acids or their derivatives.

Many of the fatty acid products affected are edible and the development of off-flavours may accordingly affect their taste as well as their odour. Off-flavour development may be described as flavour reversion, since it occurs even after a product has undergone purification e.g. by deodorisation to remove off-flavour components originally present.

While it is not intended to limit the scope of the invention claimed by any expression as to the mechanism of reactions involved, it is believed that the off-flavours are due to the presence of unsaturated carbonyl compounds produced by the autoxidation of polyunsaturated fatty acids or their derivatives. Although antioxidants may be used in an effort to arrest the autoxidation, in practice the deterioration cannot be totally eliminated, and owing to their very low threshold value the amount necessary for the detection of these oxidised compounds is so low that off-flavours still tend to be produced even in the presence of antioxidants. The threshold value is defined by P. W. Meyboom (J. Am. Oil Chem. Soc. 41 (1964), 326–8), as the concentration in mg. compound/kg. paraffin oil which can be perceived organoleptically by half of a panel of testers.

According to the present invention a process for the preparation of fatty acid products of improved flavour characteristics comprises incorporating a small amount of a flavour counteractant into a fatty acid product susceptible to autoxidation during storage with the development of off-flavours, the flavour counteractant comprising a compound having the structure RCH=CHCH=CH—Z in which R represents an alkyl group containing up to 9 carbon atoms and Z represents a polar group.

While the invention is effective in stabilising a wide range of products susceptible to autoxidation, it is particularly useful for tallow products, soybean products, and fish oil products, all of which present particularly difficult flavour reversion problems.

Further examples of fatty acid products to which the invention may be applied include rapeseed oil, butter, partially hardened glyceride oils and fats including partially hardened fish oil and soybean oil. Products containing these fatty acid derivatives which are suitable for treatment in accordance with the invention include shortenings and bakery margarines, cake mixes, mayonnaise and salad dressing as well as soaps, particularly toilet soaps of the fatty acids. The principal application of the invention however is in the treatment of edible fats and oils, glycerides of which contain residues of unsaturated fatty acids having 18 or more carbon atoms and up to 22 carbon atoms. These have for the most part even numbers of carbon atoms and the unsaturated centres are remote from the functional group.

The counteractants on the other hand are compounds having a perceptible odour which contain not more than 13 carbon atoms in a 2:4 dienyl radical attached to a polar group. The polar group must be organoleptically acceptable as understood in the perfumery industry, having a perceptible olfactory effect which is however not irritating. The polar group must also not render the compound toxic as understood in the Food & Drug Industry, where the fatty acid product is intended for consumption, but should be palatable.

Examples of organoleptically acceptable polar groups are the acetal group, both the 1,1-dialkoxyalkyl group and an optionally substituted 1,3-dioxa-2-cyclopentyl group, the acyl group e.g. the acetyl or propionyl group, the alcohol group, e.g. the hydroxymethyl and the 1-hydroxyethyl group, the aldehyde group, the carboxyl group, the ester group, both the alkoxycarbonyl group and the acyloxymethyl group, the ether group and further groups not consisting exclusively of carbon, hydrogen and oxygen, such as the nitro group and the nitrile group.

Preferably the flavour counteractant comprises an aldehyde. The aldehydes of the above structure in which R is $H(CH_2)_n$ with $n$ being 1–4, are more preferred in tallow owing to their nutty flavours and especially where R is $H(CH_2)_3$, notably 2t 4t-octadienal, because of their relatively low threshold value, which determines the minimum quantity which can be used to give some effect, and because their volatility is comparable with that of the tallowy flavoured constituents of tallow.

Two or more counteractants may be used together. For example, although some improvement in the reversion flavour of a soyabean fatty acid product may be effected with a single aldehyde counteractant of the above structure in accordance with the invention, better results can be obtained, owing to the complex nature of the soyabean reversion flavour characteristics, by using a mixture of aldehydes in which R is $H(CH_2)_n$, $n$ being 1–4 in one and 5–9 in the other. Unsaturated aldehydes may already exist in a fatty acid product which is subject to the development of off-flavours, as an autoxidation product and particularly as an off-flavour constituent itself. Some of these have already been identified e.g. 2t,6t-nonadienal in tallow (J. of Am. Oil & Chem. Soc. 45 (1968) 468–470) 3c-hexenal in the soybean reversion flavour (Recent Advances in Food Science 3 (1962) 193–204: Butterworth), and 6t-nonenal in the flavour of several hardened oils (J. of Am. Oil & Chem. Soc. 42 (1965) 246–249). The counteractants chosen for use in accordance with the invention for the incorporation in fatty acid products in which unsaturated aldehydes have been identified in the off-flavours may be isomers of such aldehydes e.g. 2t,4t-nonadienal in tallow.

In other cases there is produced in fatty acid products as a result of autoxidation a 2:4 dienal which effects some slight improvement to the off-flavors developed during the same process, although the quantity of such dienals produced in this way is insufficient substantially to offset the off-flavors. In accordance with a preferred feature of the invention however the counteractant incorporated into such fatty acid substances is selected to augment the amount of 2,4 dienal already formed or eventually to be formed in situ during autoxidation. For example soybean oil forms during reversion the cis and trans isomers of 2t,4-heptadienal and 2t,4-decadienal and in accordance with the invention one or both of these aldehydes may be incorporated into the oil.

The invention may be applied to a wide variety of fatty acid products in various degrees of off-flavour development. The period during which a given quantity of counteractant is effective in a fatty acid product will of course be related to the degree of reversion it is required to counteract. Preferably however heavily reverted fats and oils are first subjected to a customary refining treatment, particularly deodorisation, for example by steam treatment, to remove the bulk of the off-flavor components before undergoing treatment in accordance with the invention.

The counteractants may be added at a level of 0.01–5 times their respective odour threshold values, preferably 0.3–3 times these values. Of course it is possible to add more or less of the counteractant, e.g. up to 0.1% by weight calculated on the fatty acid product, more particularly 0.1–40 parts per million of the fatty acid product. When large amounts are used the product may acquire the flavor of the additive. While this may be acceptable, it is normally preferably to add only sufficient additive to give an almost flavorless product, particularly since addition of large amounts of additive may be economically unattractive.

Where the counteractant is required to counteract the development of a substantial degree of off-flavour reversion, for example the off-flavours developed over a prolonged period in a fatty acid substance or one subject to rapid reversion or exposed to conditions promoting rapid reversion, it may be necessary to incorporate into the substance a quantity of counteractant so far above its threshold value as to impart its own flavour in the initial stages to the fatty acid substances. This effect may be minimised by the use of a further preferred feature of the invention, according to which fatty acid products of improved flavour characteristics contain a small amount of a counteractant precursor which converts to the counteractant in situ during storage. By selecting a precursor having itself only slight flavour characteristics a substantial quantity may be incorporated into the fatty acid substance, ensuring the progressive release of counteractant over a protracted period of time for effectively treating in situ the continued development of off-flavour in the fatty acid substance. A precursor which further, under the conditions of its application, functions to generate counteractant at a rate matching the development of off-flavours in the fatty acid product in which it is incorporated can therefore be used in quantities affording prolonged protection against the development of off-flavours, without the substantial intrusion of other flavours provided by the presence either of counteractant or precursor.

The invention is not intended to be limited by the expression of any theory as to the mechanism of precursor conversion to counteractants. However, the Farmer theory of autoxidation indicates that 2,4 dienals may be formed under ordinary storage conditions from compounds having the radical $$C_nH_{2n+1}CH=CH(CH_2)_pCH=(CH_2)_{1-p}$$

where $n=1-9$ and $p$ is 0 or 1.

Suitable compounds containing this radical can be represented by the following formula:

$$C_nH_{2n+1}CH=CH(CH_2)_pCH=(CH_2)_{1-p}-Y$$

in which is $n$ is 1–9, $p$ is 0 or 1 and Y represents a carboxyl group or its functional derivatives such as esters, e.g. triglycerides and partial glycerides, or salts, e.g. alkali salts, or a substituted straight or branched chain, saturated or unsaturated alkyl group, such as a straight or branched alkyl chain with a terminal carboxyl group, or its functional derivatives such as esters, e.g. triglycerides and partial glycerides, or salts, e.g. alkali salts, or amides.

Examples of counteractants which may be produced from precursors include 2t,4c/t-octadienal, the precursors for which may contain the radical:

$$H(CH_2)_3CH=CH(CH_2)_pCH=CH(CH_2)_{1-p}$$

in which $p$ is the same as before, for example:
$$H(CH_2)_3CH=CHCH=CH(CH_2)_{10}COOH$$
in which in the above formula $$p=0 \text{ and } Y=(CH_2)_9COOH$$

$H(CH_2)_3CH=CHCH_2CH=(CH_2)_9COOH$ in which similarly $p=1$ and $Y=(CH_2)_9COOH$ $H(CH_2)_3CH=CHCH_2CH=CH(CH_2)_8COOH$ in which similarly $p=1$ and $Y=(CH_2)_8COOH$ In stabilising soybean oil with 2,4-undecadienal, 9,11-octadecadienoic acid has proved to be a good precursor.

A precursor may be used in addition to the flavour counteractant, the concentration of which may then be as little as e.g. 0.05–2 times its odour threshold value. These amounts may be little more than is immediately necessary to counteract the effect of off-flavour already present in the fatty acid product.

The amount of precursor incorporated in the fatty acid product, whether alone or in conjunction with counteractants themselves, may be varied according to the type of precursor and the performance it is required to achieve. A precursor capable of conversion with ease and affording a high yield of counteractant should be used in fatty acid products sustaining rapid reversion and is adequate in concentrations represented by approximately molar equivalent to the amount of counteractant which would be necessary, for example a 2:5 dienal which readily isomerises to a 2:4 dienal. On the other hand a precursor affording only a small percentage of the flavour counteractant, for example the conversion of a polyunsaturated precursor to a 2:4-alkadienal as previously discussed, should be used in larger amounts e.g. 5–200 times the odour threshold values of the corresponding counteractant. Preferably however the amount used in such cases is from 20–100 times this value.

Expressed as a concentration by weight in the fatty acid product, it is preferred to employ a counteractant concentration of less than 20 parts per million, more particularly from 0.1–10 parts per million and especially from 0.1–3 parts per million. On the other hand, substantially greater amounts of precursors may be used, for example up to 0.1%, more particualrly from 20–500 parts per million.

Proportions outside these ranges may also be used in some circumstances.

Since only a very small proportion of the counteractant or precursor is usually required, it is often convenient to employ a suitable diluent, for example an inert solvent, e.g. a bland fat or oil, certain hydrocarbons, or other esters such as are used as solvents in the pharmaceutical industry, for the purpose of distributing the counteractants or precursors in the fatty acid products.

Preferably however, polyunsaturated acids used in the invention are incorporated as mixed glycerides of the acid with another acid compatible with the fatty acid product.

The invention is illustrated by the following examples.

Examples 1-7 illustrate the application of the invention to products containing tallow fatty acids and their derivatives. Examples 8-10 illustrate its application to soybean fatty acid products and Example 11 illustrates the application of the invention to the treatment of fish oil.

EXAMPLE 1

In this example the flavour counteractants used were 2t,4t-alkadienals dissolved in paraffin oil in different concentrations, each sufficient to bear in one drop of the solution the requisite quantity of counteractant to be incorporated into samples of tallow. This was a dry fractionated, liquid fraction of a mixture of beef and mutton tallow, in which the dienals were incorporated immediately after deodorization of the tallow. The treated samples were compared with a control sample of the tallow to which a paraffin oil droplet containing no counteractant had been added.

Both control and experimental samples were stirred magnetically at 40° C. for 15 minutes. Thereafter each sample was transferred in quadruplicate into Pyrex glass transparent bottles which were three quarters filled, and sealed. The bottles were stored at 40° C. in diffuse daylight for 2, 4 and 6 days and assessed by a panel of 5-7 members. Different bottles were used for each assessment. Storage in diffuse daylight at 40° C. is an accelerated test for the behaviour of glyceride oil, which, in practice, is stored in the dark at room temperature: 4 days under test conditions equals about 6-8 weeks' normal storage.

The results of this example are given in Table 1. In the following tables flavour assessments are expressed by the following symbols:

| | |
|---|---|
| O=neutral, tasteless. | —=not assessed. |
| B=beany. | b=slight, beany. |
| F=fried fat. | f=slight, fried fat. |
| H=hardening (flavour). | h=slight, hardening flavour. |
| HH=strong hardening. | hh=very slight hardening. |
| N=nutty. | n=slight, nutty. |
| NN=strong, nutty. | nn=very slight, nutty. |
| NNN=very strong, nutty. | |
| P=painty. | p=slight, painty. |
| T=tallowy. | t=slight, tallowy. |
| TT=strong, tallowy. | |
| TTT=very strong, tallowy. | tt=very slight, tallowy. |
| U=undefinable (flavour). | u=slight, undefinable (flavour). |

TABLE 1

| | | Assessment | | | |
|---|---|---|---|---|---|
| | | | After storing for— | | |
| Additive | Conc., mg./kg. | Fresh | 2 days | 4 days | 6 days |
| 2t,4t,-hexadienal, odour | 0.1 | O | T | T | — |
| threshold, 0.27 mg./kg. | 0.2 | O | tt | T | T |
| | 0.3 | O | tt | tt | T |
| | 0.5 | N | N | O | tt |
| | 1 | NN | NN | N | tt+N |
| | 2 | NN | NN | N | N |
| | 3 | NN | NN | N | N |
| 2t,4t,-heptadienal, odour | 0.1 | T | O | T | — |
| threshold, 10.0 mg./kg. | 0.5 | O | T | T | — |
| | 1 | O | O | T | T |
| | 3 | O | O | tt | tt |
| | 5 | nn | nn | tt | tt |
| | 10 | N | N | N | N |
| | 20 | NN | NN | NN | NN |
| 2t,4t,-octadienal, odour | 0.1 | O | T | T | — |
| threshold, 1.0 mg./kg. | 0.5 | O | O | T | T |
| | 1 | N | nn | O | tt |
| | 2 | N | N | nn | nn |
| | 3 | NN | N | N | N |
| 2t,4t,-nonadienla, odour | 0.1 | O | T | T | — |
| threshold, 2.5 mg./kg. | 0.5 | O | T | T | — |
| | 1 | O | tt | T | — |
| | 2 | O | tt | T | — |
| | 2.5 | O | tt | T | — |
| | 3 | N | nn | nn | nn |
| | 5 | NN | NN | N | N |
| | 0 | NNN | NNN | NN | NN |
| Control sample | Nil | O | T | TT | TTT |

EXAMPLE 2

In this example a batch of oleo-tallow ex-Australia of inferior stability was used. The example was carried out as described in Example 1. The results were similar to those obtained from Example 1.

From these two examples it was clear that in low concentration all the dienals used counteracted the tallowy flavour, 2t,4t-octadienal giving the best results. When used in somewhat higher concentration the dienals give their own flavour to the oleo-tallow, but during storage the off-flavour developed counteracted the dienal flavour.

The combined addition of 2t,4t-octadienal and a precursor thereof, in the form of 10,13-heptadecadienoic acid with a trans-content of about 65% added as a mixed glyceride with oleic acid is shown in Example 3.

EXAMPLE 3

2t,4t-octadienal was incorporated into samples of a fully refined oleo-tallow at three levels (1, 2 and 3 mg./kg.) and the precursor 10,13-heptadecadienoic acid with it at a level of 30, 40, 60 and 80 mg./kg. respectively, in the form of a mixed glyceride with oleic acid containing 7% by weight of the precursor. The procedure was described in Example 1. The results appear in Table 2, from which it is apparent that no detectable deterioration took place after 6 days and that only in the lower ranges counteractant/precursor concentrations was even a faintly tallowy odour detected.

TABLE 2
Concentration, mg./kg.

| | | Assessment | | | | |
|---|---|---|---|---|---|---|
| | | | After storing for— | | | |
| Octadienal | Precursor | Fresh | 2 days | 4 days | 6 days | 8 days |
| 1 | 30/40 | N | n | O | tt | tt |
| 1 | 60/80 | N | O | O | tt | tt |
| 2 | 30/40/60/80 | NN | N | N | n | n |
| 3 | 30/40/60/80 | NN | N | N | N | N |

10,13-heptadecadienoic acid is a new compound which was prepared as follows:

The di-Grignard compound of 10-undecynoic acid was coupled with 1-bromo-2-hexyn. After distilling the reaction product, crude 10,13-heptadecadiynoic acid was obtained with B.P. 177° C. at 0.45 mm. Hg pressure. The acid was recrystallised from alcohol and petrol ether at −20° C. as white crystals which turned yellow quickly in contact with air, affording a yield of 39.4%; melting point of the crystals was 38.9-39.4° C., refractive index $n_D^{65}$ 1.4638, and acid value 218.4, compared with theoretical value 214.2 for $C_{17}H_{26}O_2$. Purity according to GLC was 100% and the IR-spectrum of the product was in accordance with the structure of 10,13-heptadecadiynoic acid.

This diynoic acid was hydrogenated to 10c,13c-heptadecadienoic acid by means of Lindlar-catalyst and quinoline. Its purity according to GLC analysis was 99.5%, refractive index $n_D^{20}$ 1.4680, $n_D^{65}$ 1.4528. The UV-spectrum before alkali isomerisation showed no maximum at 233 nm. and after alkali isomerisation showed no maximum at 233 nm using alcohol

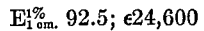
$E_{1cm}^{1\%}$ 92.5; e24,600

IR-spectrum: bands at about 700 and 1650 cm.$^{-1}$ (—$CH_2$—CH=CH—), 1700 cm.$^{-1}$ (—COOH) and 3020 cm.$^{-1}$ (—CH=); trans double bonds not detectable.

A mixture of 10c,13c-heptadecadienoic acid and oleic acid was heated at 200° C. for 6-7 hours, while gaseous $SO_2$ was introduced. Afterwards the $SO_2$ was removed by means of $N_2$.

The elaidinized mixture was then distilled and the distillate with a trans-content of about 65% was esterified with glycerol in a usual way.

EXAMPLE 4

In this example 2t,4t-octadienal was added at three different levels of 1, 2 and 3 mg./kg. to tallow which had been neutralised and bleached, but not deodorised.

The samples were assessed for flavour against a control sample containing no octadienal. The sample with 2 mg./kg. octadienal was judged to have the best overall odour with very little tallowy odour, whereas the sample with 3 mg./kg. was found to have a noticeable odour of the additive itself. The sample with 1 mg./kg. had a strong tallowy odour, whereas the control sample had the strongest tallowy odour. The samples were then kept for two months, at 4° C. and then re-assessed by the expert panel, in the manner described in Example 1. The 2 mg./kg. sample had not noticeably deteriorated during storage whereas in the 3 mg./kg. sample the odour of the octadienal was evident above the tallow odour. The 1 mg./kg. sample was judged to have increased in tallowiness, and so had the control sample.

EXAMPLE 5

In this example a pastry margarine based on tallow was treated using 2t,4t-octadienal at 2 mg./kg. concentration and compared with the untreated margarine. The treated and untreated margarine, prepared in small pieces, was then coated with powdered, fully hardened oleostearin to prevent the pieces sticking together. A readily discernible clean, non-tallowy flavour was evident in the treated pieces, whereas the control batch without octadienal had a strong tallowy flavour.

One week after manufacture the treated and untreated pieces were submitted to the bakery for testing. Both were made up into patty shells which were first evaluted hot, straight from the oven, and later evaluated after cooling to room temperature, by a taste panel. In both cases all tasters expressed a preference for the shells made from the treated pastry margarine, although the preference was less pronounced with the cold shells.

Further samples of the treated and untreated pastry margarine were stored for seven weeks more to a total of eight weeks and they were then again made up into patty shells and tested as before. The taste panel preference was again in favour of the margarine containing octadienal, more particularly in the warm shells.

EXAMPLE 6

Similar tests to those described in Example 5 were carried out on coated margarine based on tallow. The treated samples containing 2 mg./kg. of 2t,4t-octadienal. The margarine was evaluated in puff pastry biscuit.

The treated product was again decidedly superior in flavour to the control product in respect of absence of tallow flavour. This experiment indicated that tallow stabilised according to this invention could be effectively used as a substitute for hardened coconut oil, which is often used in pastry margarine.

EXAMPLE 7

In this example several other compounds tested in fully refined oleo-tallow in accordance with the invention were shown to be effective counteractants and were compared with some of the aldehydes already described. Comparisons between cis and trans isomers were also made. The procedure was similar to that described in Example 1. Further details and results are given in Table 4, from which it appears, that no significantly different results are obtained from 4c- and 4t-isomers. The effectiveness of the compounds tested is shown to depend largely on the organoleptically acceptable polar group, the aldehyde, acetyl, hydroxymethyl and acetoxymethyl groups being more effective than the carboxyl and methoxycarbonyl groups.

TABLE 3

| Additive | Conc., mg./kg. | Assessment |  |  |  |
|---|---|---|---|---|---|
|  |  | Fresh | 2 days | 4 days | 6 days |
| 2t,4t-octadienal | 2 | N | n | O | tt |
|  | 10 | N | O | O | t |
|  | 30 | N | N | O | O |
| 2t,4c-octadienal | 20 | N | N | O | O |
| 2t,4t-nonadienal | 2 | N | n | O | tt |
|  | 5 | N | N | N | n |
| 2t,4c-nonadienal | 2 | N | N | O | tt |
|  | 5 | N | N | N | n |
| 2t,4c-hexadienoic acid | 3 | O | t | t | t |
|  | 30 | O | t | t | t |
| 2t,4c-decadienoic acid | 3 | O | t | t | T |
|  | 30 | O | T | t | T |
| 2t,4t-decadienoic acid | 5 | O | t | T | T |
|  | 30 | O | t | T | T |
| Methyl 2t,4c-hexadienoate | 5 | O | t | T | T |
|  | 30 | O | t | T | T |
| Methyl 2t,4c-decadienoate | 5 | O | t | T | T |
|  | 30 | O | t | T | T |
| Methyl 2t,4t-decadienoate | 3 | O | t | T | T |
|  | 30 | O | t | T | T |
| 2t,4t-octadienyl acetate | 5 | N | O | O | t |
|  | 40 | N | O | O | t |
| 2t,4t-octadienol | 20 | N | — | — | n [1] |
| 2t,4t-dodecadienol | 20 | N | — | — | n [1] |
| 3t,5t-octadien-2-on | 0.1 | O | t | t | T |
| Do | 2 | O | u | tt | t |
| Control sample | Nil | O | T | TT | TTT |

[1] After storing for 8 days, instead of 6 days.

Examples 8–13 ilustrate the treatment of fatty acid products containing soybean fatty acids in accordance with the invention.

EXAMPLE 8

In this example, trials 1–15 and the control sample were carried out with a soybean oil of good quality, which was fully refined. Samples in which additives were incorporated in accordance with the invention were prepared in a manner analogous to that described in Example 1, but this time at room temperature. The flavour assessment before and after storing in diffuse daylight at room temperature and further particulars of the trials appear in Table 4.

TABLE 4

| Trial | Additive | Odour threshold, mg./kg. | Conc., mg./kg. | Assessment |  |  |  |
|---|---|---|---|---|---|---|---|
|  |  |  |  | Fresh | 2 days | 4 days | 6 days |
| 1 | Hexadienal | 0.27 | 0.01 | O | p | P | b+P |
| 2 | Heptadienal | 10.0 | 0.1 | O | p | P | b+P |
| 3 | Octadienal | 1.0 | 0.05 | O | p | P | b+P |
| 4 | Nonadienal | 2.5 | 0.1 | O | O | b+p | B+P |
| 5 | Decadienal | 2.2 | 0.1 | O | b | B+p | B+P |
| 6 | Undecadienal | 2.0 | 0.5 | O | B | B | B+p |
| 7 | Dodecadienal | 0.1 | 0.5 | O | B | B | B+p |
| 8 | Hexadienal | | 0.1 | O | O | O | b |
|  | Undecadienal | | 0.5 | | | | |
| 9 | Heptadienal | | 0.1 | U | O | O | b |
|  | Undecadienal | | 1.0 | | | | |
| 10 | Heptadienal | | 0.1 | U | O | O | b |
|  | Dodecadienal | | 1.0 | | | | |
| 11 | Octadienal | | 0.1 | f | O | O | b |
|  | Decadienal | | 1.0 | | | | |
| 12 | Octadienal | | 0.05 | U | O | O | b |
|  | Undecadienal | | 1.0 | | | | |
| 13 | Octadienal | | 0.05 | U | O | O | b |
|  | Dodecadienal | | 1.0 | | | | |
| 14 | Heptadienal | | 0.1 | | | | |
|  | Nonadienal | | 0.1 | | | | |
|  | Undecadienal | | 0.5 | O | O | O | O |
| 15 | Octadienal | | 0.05 | | | | |
|  | Nonadienal | | 0.1 | | | | |
|  | Undecadienal | | 0.5 | O | O | O | O |
| Control sample | | Nil | O | B+P | B+P | B+P |

Some stabilisation is clearly obtained even when only one counteractant is added at levels as low as 0.01–0.25 times the odour threshold value. The trials also demonstrate that the $C_{6-9}$-alkadienals are generally more effective in counteracting the beany part of the reversion flavour of soybean oil, whereas the alkadienals above $C_9$ are generally more effective in counteracting the painty part of the reversion flavour.

Trials 8–15 demonstrate that both parts can be substantially suppressed when two or more counteractants are used together, to complement each other, at a level at which each counteractant alone has only a limited effect.

EXAMPLE 9

In this example the procedure of Example 8 was followed, using however soybean oil of an inferior quality, in which larger amounts of the counteractants were incorporated. A similar trend can be seen in the results given in Table 5 to that apparent from the results in the previous example.

TABLE 5

| | | | Assessment— After storing for— | | | |
|---|---|---|---|---|---|---|
| Trial | Additive | Conc. mg./kg. | Fresh | 2 days | 4 days | 6 days |
| 16 | Hexadienal | 0.3 | N+p | n+p | P | P |
| 17 | Heptadienal | 1.0 | N+p | n+P | P | P |
| 18 | Octadienal | 1.0 | N+p | P | P | b+P |
| 19 | Nonadienal | 1.0 | N | b+p | b+p | B+P |
| 20 | Decadienal | 1.0 | O | B | B | B |
| 21 | Undecadienal | 1.5 | O | B | B | B |
| 22 | Dodecadienal | 1.5 | O | B | B | B |
| 23 | {Hexadienal | 0.3 | | | | |
| | Undecadienal | 1.3 | N | O | O | b |
| 24 | {Heptadienal | 1.0 | | | | |
| | Undecadienal | 1.0 | N | n | O | o |
| 25 | {Heptadienal | 1.0 | | | | |
| | Dodecadienal | 1.0 | N | n | O | o |
| 26 | {Octadienal | 1.0 | | | | |
| | Undecadienal | 1.0 | N | O | O | b |
| 27 | {Octadienal | 1.0 | | | | |
| | Dodecadienal | 1.0 | N | O | O | b |
| | Control sample | Nil | p | B+p | B+P | B+P |

EXAMPLE 10

In this example the same grade of soybean oil as that used in Example 9 was employed. The effect was compared of incorporating into this oil a combined counteractant consisting of 2t,4t-octadienal and 2t,4t-undecadienal with corresponding combined precursors.

TABLE 6

| | Additive concn., mg./kg. | | Flavour assessment after— | | | |
|---|---|---|---|---|---|---|
| Test | Precursor | Dienal | 0 days | 2 days | 4 days | 6 days |
| 1 | {C₈ — | 1.0 | N | 0 | 0 | b+p |
| | C₁₁ — | 1.0 | | | | |
| 2 | {C₈ 20 | 0.1 | u | 0 | 0 | 0 |
| | C₁₁ 500 | 0.5 | | | | |
| 3 | {C₈ 75 | — | u | 0 | 0 | 0 |
| | C₁₁ 500 | 0.5 | | | | |
| 4 | {C₈ 75 | — | 0 | 0 | 0 | u |
| | C₁₁ 1,000 | — | | | | |
| Control | | | P | B+P | B+P | B+P |

The C₈ precursor was 10,13-heptadecadienoic acid, and the C₁₁ precursor was 9,11-octadecadienoic acid. The acids were in the form of a mixed glyceride with oleic acid and formed 7% of the total acid part of the glycerides. The amount of glyceride additive actually used was therefore about 15 times the amount of precursor acid given above. Further details including particulars of the flavour assessment appear in Table 6, from which it is apparent that a product containing both precursors and at least one of the dienals remains substantially flavourless.

EXAMPLE 11

In this example various dienals were added at room temperature to fully refined hardened fish oil with an Iodine Value of 70, in a manner analogous to that described in Example 1. The results are given in Table 7.

TABLE 7

| | | Assessment After storing in diffuse daylight at room temperatures for— | | |
|---|---|---|---|---|
| Additive | Conc., mg./kg. | Fresh | 2 days | 4 days |
| 2t,4t-heptadienal | 5 | N | h | h |
| Do | 10 | N | U | U |
| 2t,4t-octadienal | 5 | N | h+N | h+N |
| Do | 10 | N | hh+NN | hh+NN |
| 2t,4t-nonadienal | 2 | N | F+N | F+N |
| Do | 5 | N | F+N | F+N |
| 2t,4c-nonadienal | 1 | N | u | u |
| Do | 3 | N | u | u |
| 2t,4t-decadienal | 3 | F | F+h | F+h |
| Do | 5 | F | F | F |
| 2t,4c-decadienal | 5 | N | h+n | h+n |
| Do | 10 | N | F+N | F+N |
| 2t,4t-undecadienal | 3 | N+U | h | H |
| Control sample | Nil | h | HH | HH |

What is claimed is:
1. A process comprising incorporating into a fatty acid product on off-flavor counteractant having the formula:

R—CH=CH—CH=CH—Z in which R is an alkyl group containing 1-9 carbon atoms and Z is a polar group selected from the group consisting of the 1,3-dioxa-2-cyclopentyl group,
the acetyl group,
the propionyl group,
the hydroxymethyl group,
the 1-hydroxyethyl group,
the aldehyde group,
the methoxycarbonyl group,
the acetoxymethyl group,
the nitro group, and
the nitrile group.

said fatty acid product being susceptible to autoxidation, said counteractant being effective to counteract any off-flavor developed as a result of said autoxidation.

2. A process according to claim 1, in which the flavour counteractant has the formula

R—CH=CH—CH=CH—Z, in which R is an alkyl group containing 1-9 carbon atoms and Z is a polar group selected from the group consisting of the group —CHO, the group —CO—CH₃, the group —CH₂OH and the group —CH₂O—CO—CH₃.

3. A process according to claim 1, in which the fatty acid product is a tallow product and the flavour counteractant has the formula R—CH=CH—CH=CH—Z, in which R is the group H(CH₂)ₙ with n=1, 2, 3 or 4 and Z is the group —CHO.

4. A process according to claim 1, in which the fatty acid product is a soybean product and the flavour counter-reactant is a mixture of a 2,4-alkadienal having 6-9 carbon atoms and a 2,4-alkadienal having 10-14 carbon atoms.

5. A process according to claim 1, in which the fatty acid product is a soybean product and the flavour counteractant is 2,4-undecadienal which is incorporated into the soybean product by admixing the soybean product with 9,11-octadecadienoic acid or a glyceride of said 9,11-octadecadienoic acid.

References Cited

UNITED STATES PATENTS

| | | |
|---|---|---|
| 2,796,348 | 6/1957 | Colten et al. 99—163 X |
| 3,158,489 | 11/1964 | Baur 99—118 |
| 3,158,490 | 11/1964 | Baur et al. 99—163 X |
| 3,211,558 | 10/1965 | Baur 99—118 |
| 3,291,831 | 12/1966 | Luvisi 260—576 |
| 3,353,966 | 11/1967 | Hugenberg et al. 99—163 |
| 3,353,967 | 11/1967 | Lutton 99—163 |
| 3,466,323 | 9/1969 | Tholstrup et al. 260—481 |
| 3,497,535 | 2/1970 | Lennon 99—398.5 |
| 3,443,970 | 5/1969 | Wolf et al. 99—163 |

FOREIGN PATENTS 1,034,352  6/1966  Great Britain.

NORMAN YUDKOFF, Primary Examiner

K. VAN WYCK, Assistant Examiner

U.S. Cl. X.R.

99—118

UNITED STATES PATENT OFFICE
CERTIFICATE OF CORRECTION

Patent No. 3,664,851  Dated May 23, 1972

Inventor(s) Willem Hendrik Feenstra and Johann Georg Keppler

It is certified that error appears in the above-identified patent and that said Letters Patent are hereby corrected as shown below:

Column 2, line 66, delete "&".

Column 2, line 70, delete "&".

Column 3, line 4, "prdouced" should read --produced--.

Column 3, line 74, "$C_nH_{2n+1}CH=CH(CH_2)_pCH=(CH_2)_{1-p}$"
  should read
  $$--C_nH_{2n+1}CH=CH(CH_2)_pCH=CH(CH_2)_{1-p}--.$$

Column 4, line 3, "$C_nH_{2n+1}CH=CH(CH_2)_pCH=(CH_2)_{1-p}-Y$"
  should read
  $$--C_nH_{2n+1}CH=CH(CH_2)_pCH=CH(CH_2)_{1-p}-Y--.$$

Column 4, line 24, "$H(CH_2)_3CH=CHCH_2CH=(CH_2)_9COOH$"
  should read
  $$--H(CH_2)_3CH=CHCH_2CH=CH(CH_2)_9COOH--.$$

Column 5, line 64, "2t,4t-nonadienla" should read --2t,4t-nonadienal--.

Column 5, line 69, "0 (mg./kg.)" should read --10 (mg./kg.)--.

Column 6, line 61, "no" should read --a--.

Column 6, line 69, "oliec" should read --oleic--.

Signed and sealed this 10th day of April 1973.

(SEAL)
Attest:

EDWARD M. FLETCHER, JR.
Attesting Officer

ROBERT GOTTSCHALK
Commissioner of Patents